United States Patent
Ishizuka

(10) Patent No.: US 11,271,314 B2
(45) Date of Patent: Mar. 8, 2022

(54) ANTENNA COUPLING ELEMENT, ANTENNA DEVICE, AND ELECTRONIC DEVICE

(71) Applicant: Murata Manufacturing Co., Ltd., Nagaokakyo (JP)

(72) Inventor: Kenichi Ishizuka, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 10 days.

(21) Appl. No.: 16/744,226

(22) Filed: Jan. 16, 2020

(65) Prior Publication Data
US 2020/0153099 A1 May 14, 2020

Related U.S. Application Data

(63) Continuation of application No. PCT/JP2018/021580, filed on Jun. 5, 2018.

(30) Foreign Application Priority Data

Jul. 21, 2017 (JP) .............................. JP2017-141549

(51) Int. Cl.
*H01Q 5/30* (2015.01)
*H01Q 9/04* (2006.01)
*H01Q 1/48* (2006.01)

(52) U.S. Cl.
CPC .............. *H01Q 9/045* (2013.01); *H01Q 1/48* (2013.01)

(58) Field of Classification Search
CPC .............. H01Q 1/48–1/50; H01Q 5/30–5/392
See application file for complete search history.

(56) References Cited

U.S. PATENT DOCUMENTS

| 2011/0309994 A1* | 12/2011 | Kato | ....................... H01Q 1/50 343/860 |
|---|---|---|---|
| 2014/0049440 A1 | 2/2014 | Ueki et al. | |
| 2014/0218246 A1 | 8/2014 | Ishizuka et al. | |
| 2014/0266964 A1* | 9/2014 | Kato | ....................... H01Q 1/50 343/860 |
| 2017/0194692 A1 | 7/2017 | Sayama et al. | |
| 2021/0119335 A1* | 4/2021 | Mizuno | .................. H01Q 5/307 |

FOREIGN PATENT DOCUMENTS

| JP | 2014-053808 A | 3/2014 |
|---|---|---|
| WO | 2012/153690 A1 | 11/2012 |
| WO | 2014/034587 A1 | 3/2014 |
| WO | 2015/182340 A1 | 12/2015 |
| WO | 2016/052733 A1 | 4/2016 |

OTHER PUBLICATIONS

Official Communication issued in International Patent Application No. PCT/JP2018/021580, dated Aug. 28, 2018.

* cited by examiner

*Primary Examiner* — Hasan Islam
(74) *Attorney, Agent, or Firm* — Keating & Bennett, LLP

(57) ABSTRACT

An antenna device includes first and second radiating elements, and an antenna coupling element. The antenna coupling element includes a primary coil electrically connected between the first radiating element and a feed circuit and a secondary coil inductively coupled to the primary coil and electrically connected between the second radiating element and a ground. A capacitor is provided between the primary coil and the secondary coil, thus causing current to flow from the primary coil to the secondary coil or the second radiating element via the capacitor even at an anti-resonant frequency of the first radiating element.

17 Claims, 6 Drawing Sheets

ANTENNA COUPLING ELEMENT, ANTENNA DEVICE, AND ELECTRONIC DEVICE

CROSS REFERENCE TO RELATED APPLICATIONS

This application claims the benefit of priority to Japanese Patent Application No. 2017-141549 filed on Jul. 21, 2017 and is a Continuation Application of PCT Application No. PCT/JP2018/021580 filed on Jun. 5, 2018. The entire contents of each application are hereby incorporated herein by reference.

BACKGROUND OF THE INVENTION

1. Field of the Invention

The present invention relates to an antenna coupling element that is used in an electronic device including an antenna, an antenna device including the antenna coupling element, and an electronic device including the antenna coupling element.

2. Description of the Related Art

In recent years, wider bandwidths of frequency bands used for communication have been proceeding. With high integration of electronic devices including a communication device, there is no margin space for antennas, and many antennas cannot be provided to cover multiple frequency bands. Because of these situations, the need for antennas having wideband characteristics has been increasing.

As one method of providing a wideband antenna, a technique for adding the characteristics of a passive radiating element physically separated from a feed circuit to the characteristics of a feed radiating element by coupling the passive radiating element to the feed radiating element with a magnetic field is used.

FIG. 8 is an equivalent circuit diagram of an antenna device including a feed radiating element and a passive radiating element that are coupled to each other with a magnetic field. In this way, in the antenna device including the passive radiating element, first, the feed radiating element is fed with power from a feed circuit 1, and the passive radiating element is coupled to the feed radiating element with a magnetic field.

For example, International Publication No. 2012/153690 describes an antenna device. The antenna device includes two radiating elements and a coupling adjustment circuit that controls power to be fed to the two radiating elements.

To provide an antenna device with a wider bandwidth, a feed radiating element is often used for a fundamental resonant mode and a 3λ/4 harmonic resonant mode. FIG. 9A shows the frequency characteristics of an antenna device in which a passive radiating element is further added to a feed radiating element. The abscissa axis represents frequency, and the ordinate axis represents a return loss (S11) of the antenna device viewed from a feed circuit. In FIG. 9A, resonant points (poles) appear at frequencies fo, fh, fs. The frequency fo is a fundamental (λ/4) resonant frequency of the feed radiating element, and the frequency fh is a harmonic (3λ/4) resonant frequency of the feed radiating element. The frequency fs is a resonant frequency of the passive radiating element.

When the resonant frequency fs of the passive radiating element is brought close to the harmonic resonant frequency fh of the feed radiating element, a wideband antenna device that uses the frequency fo as a low band and uses a wide frequency band including the frequency fs and the frequency fh as a high band is formed.

The feed radiating element also has an anti-resonant mode in which the feed radiating element resonates at λ/2 (the electrical length of an antenna is λ/2). The anti-resonant frequency is a frequency between the fundamental resonant frequency fo and the harmonic resonant frequency fh. In the anti-resonant mode, the feed radiating element viewed from the feed circuit is open in terms of impedance, so no current flows though the feed radiating element.

However, the above-described magnetic field coupling between the feed radiating element and the passive radiating element occurs as a result of flow of current through the feed radiating element, so current is required to flow through the feed radiating element for the antenna device to exhibit predetermined characteristics. Therefore, magnetic field coupling does not occur at the anti-resonant frequency at which no current flows through the feed radiating element.

FIG. 9B shows a graph for a further wideband device in which the length of the passive radiating element is extended and the resonant frequency of the passive radiating element is decreased, as compared to the case shown in FIG. 9A. However, in the example shown in FIG. 9B, the resonant frequency fs of the passive radiating element coincides with the anti-resonant frequency fa. Accordingly, the passive radiating element is not coupled to the feed radiating element, and the resonant characteristics of the passive radiating element do not appear. In other words, a wideband effect is not obtained from provision of the passive radiating element.

SUMMARY OF THE INVENTION

Preferred embodiments of the present invention provide antenna coupling elements that each enable effective use of resonance of a passive radiating element by overcoming a problem due to anti-resonance of a feed radiating element and that enables a wider bandwidth in a wide frequency band, and antenna devices and electronic devices, including the antenna coupling element.

An antenna coupling element according to a preferred embodiment of the present invention includes a first coil, and a second coil coupled to the first coil. A first end of the first coil is a feed circuit connection end. A second end of the first coil is a feed radiating element connection end. A first end of the second coil is a passive radiating element connection end. A second end of the second coil is a ground connection end. A winding direction of the first coil that is routed along a current path from the feed circuit connection end to the feed radiating element connection end and a winding direction of the second coil that is routed along a current path from the second radiating element connection end to the ground connection end are opposite to each other.

With the above features, current flowing through the first coil between the feed circuit and the first radiating element flows through the second coil or the second radiating element via capacitance regardless of whether current is induced to the second coil as a result of flow of current through the first radiating element. Therefore, even when the resonant frequency is equal or substantially equal to the anti-resonant frequency, the second radiating element resonates and contributes to a wider bandwidth.

According to a preferred embodiment of the present invention, an antenna coupling element includes a plurality of conductor patterns provided in a plurality of layers laminated via an electrically insulating layer, and a plurality of interlayer connection conductors providing interlayer connection between predetermined positions of the plurality of conductor patterns. The plurality of conductor patterns includes a first conductor pattern, a second conductor pattern, a third conductor pattern, and a fourth conductor pattern, respectively provided in different layers in order of a direction of the lamination. The plurality of interlayer connection conductors includes a first interlayer connection conductor providing interlayer connection between the first conductor pattern and the second conductor pattern, and a second interlayer connection conductor providing interlayer connection between the third conductor pattern and the fourth conductor pattern. The first coil includes the first conductor pattern, the second conductor pattern, and the first interlayer connection conductor. The second coil includes the third conductor pattern, the fourth conductor pattern, and the second interlayer connection conductor.

With the above features, a capacitance is generated particularly between the second conductor pattern and the third conductor pattern. Current flowing through the first coil between the feed circuit and the first radiating element flows through the second coil or the second radiating element via the capacitance regardless of whether current is induced to the second coil as a result of flow of current through the first radiating element.

According to a preferred embodiment of the present invention, each of the second conductor pattern and the third conductor pattern is longer than each of the first conductor pattern and the fourth conductor pattern. With these features, the area in which the second conductor pattern and the third conductor pattern face each other increases, so the capacitance that is generated between the first coil and the second coil is significantly increased.

According to a preferred embodiment of the present invention, at least one of the second conductor pattern and the third conductor pattern includes a capacitance generating conductor pattern that faces in a direction of the lamination to partially generate a capacitance. With these features, the capacitance that is generated between the first coil and the second coil is significantly increased.

According to a preferred embodiment of the present invention, the third conductor pattern has an extended conductor pattern that extends to an end portion of the electrically insulating layer, and the capacitance generating conductor pattern includes the extended conductor pattern and a conductor pattern facing the extended conductor pattern. With these features, the extended conductor pattern can also be used as one of the capacitance generating conductor patterns, so further miniaturization is possible accordingly.

According to a preferred embodiment of the present invention, a capacitance is generated between the first coil and the second coil. With these features, current flowing through the first coil flows through the second coil or the second radiating element via the capacitance.

An antenna device according to a preferred embodiment of the present invention includes an antenna coupling element according to a preferred embodiment of the present invention, a first radiating element electrically connected to the first radiating element connection end, and a second radiating element electrically connected to the second radiating element connection end.

With the above features, even when the resonant frequency of the second radiating element coincides with the anti-resonant frequency, the resonant characteristics of the second radiating element appear, and a wideband antenna device is provided.

An antenna device according to a preferred embodiment of the present invention includes a first radiating element, a second radiating element, a coupling circuit including a first coupling element and a second coupling element, the first coupling element being electrically connected between the first radiating element and a feed circuit, the second coupling element being inductively coupled to the first coupling element and electrically connected between the second radiating element and a ground, and a capacitance provided between the first coupling element and the second coupling element. At an anti-resonant frequency of the first radiating element, current flows from the first coupling element to the second coupling element or the second radiating element via the capacitance.

With the above features, even when the resonant frequency of the second radiating element coincides with the anti-resonant frequency, the resonant characteristics of the second radiating element appear, and a wideband antenna device is provided.

According to a preferred embodiment of the present invention, the first coupling element and the second coupling element are coils coupled to each other with a magnetic field, and the capacitance is a capacitance that is generated between the coil that is the first coupling element and the coil that is the second coupling element. With these features, an induction coupling structure between the first coupling element and the second coupling element and addition of a capacitance are provided with a simple configuration.

According to a preferred embodiment of the present invention, at an anti-resonant frequency of the first radiating element, a direction of current that flows from the first coupling element to the second coupling element via the capacitance is a same direction as a direction of current that flows through the second coupling element as a result of magnetic field coupling with the first coupling element. With these features, current flowing through the second coupling element as a result of magnetic field coupling with the first coupling element and current flowing through the second coupling element from the first coupling element via the capacitance enhance each other, and the second radiating element is driven, so a wider bandwidth is provided by the second radiating element.

According to a preferred embodiment of the present invention, a capacitor may be electrically connected between a connection end of the first radiating element and a connection end of the second radiating element. With these features, a predetermined capacitance can be added independently of the configuration of a coupling circuit.

According to a preferred embodiment of the present invention, and electronic device includes an antenna device according to a preferred embodiment of the present invention, a feed circuit electrically connected to the antenna device, and a casing accommodating the feed circuit, and a portion or all of the first radiating element and the second radiating element are defined by a portion of the casing.

With the above features, no electrically conductive member or conductor pattern exclusively for a radiating element needs to be provided, so miniaturization is possible. Even in the electronic device including a metal casing, no shielding is performed by the metal casing.

According to the preferred embodiments of the present invention, antenna coupling elements that each enable effective use of resonance of a second radiating element by resolving a problem due to anti-resonance of a first radiating element and that enables a wider bandwidth in a wide frequency band, and antenna devices and electronic devices, each including an antenna coupling element, are provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
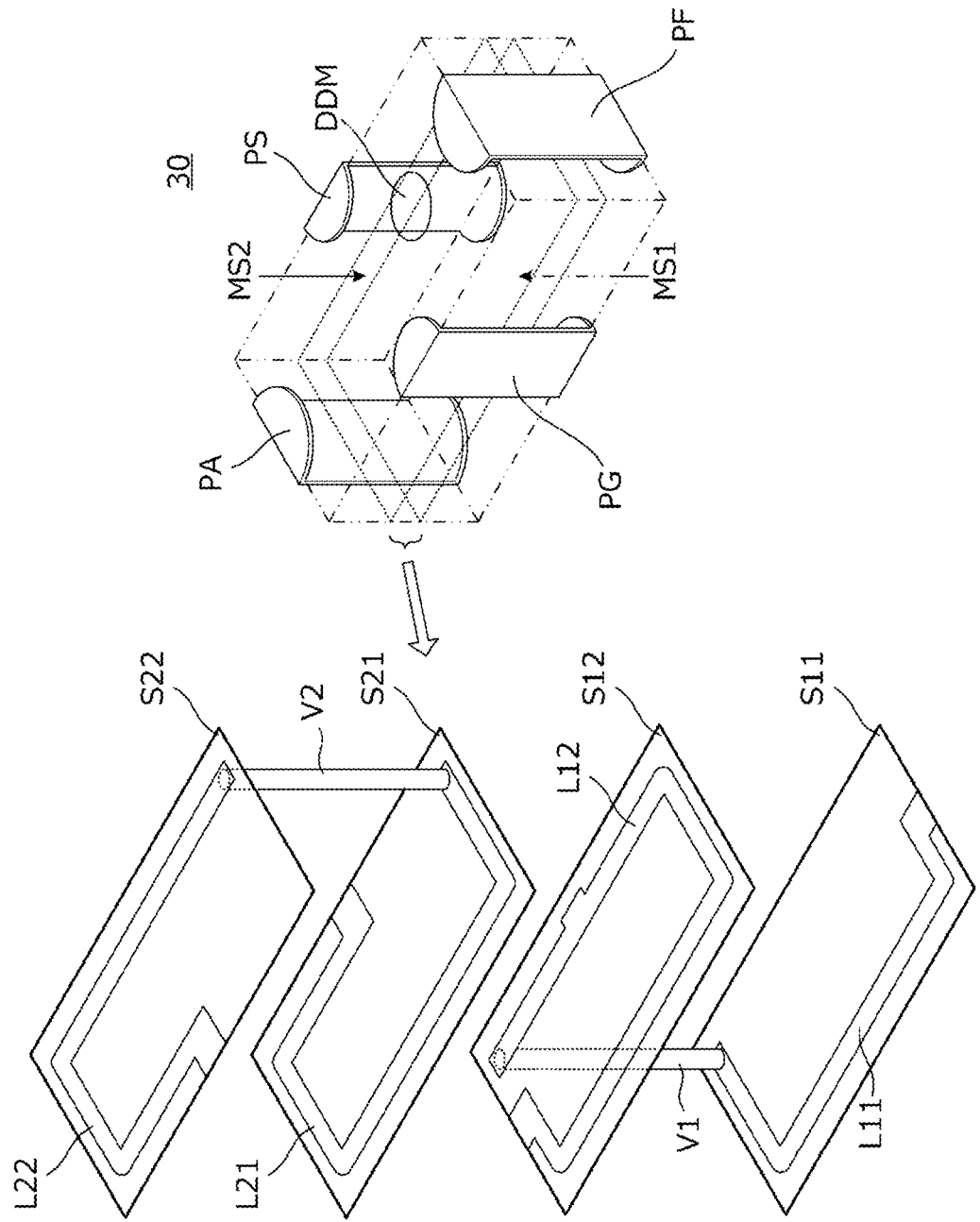
FIG. 1 is a perspective view of an antenna coupling element 30 that is an example of a coupling circuit according to a first preferred embodiment of the present invention.
Figure 2:
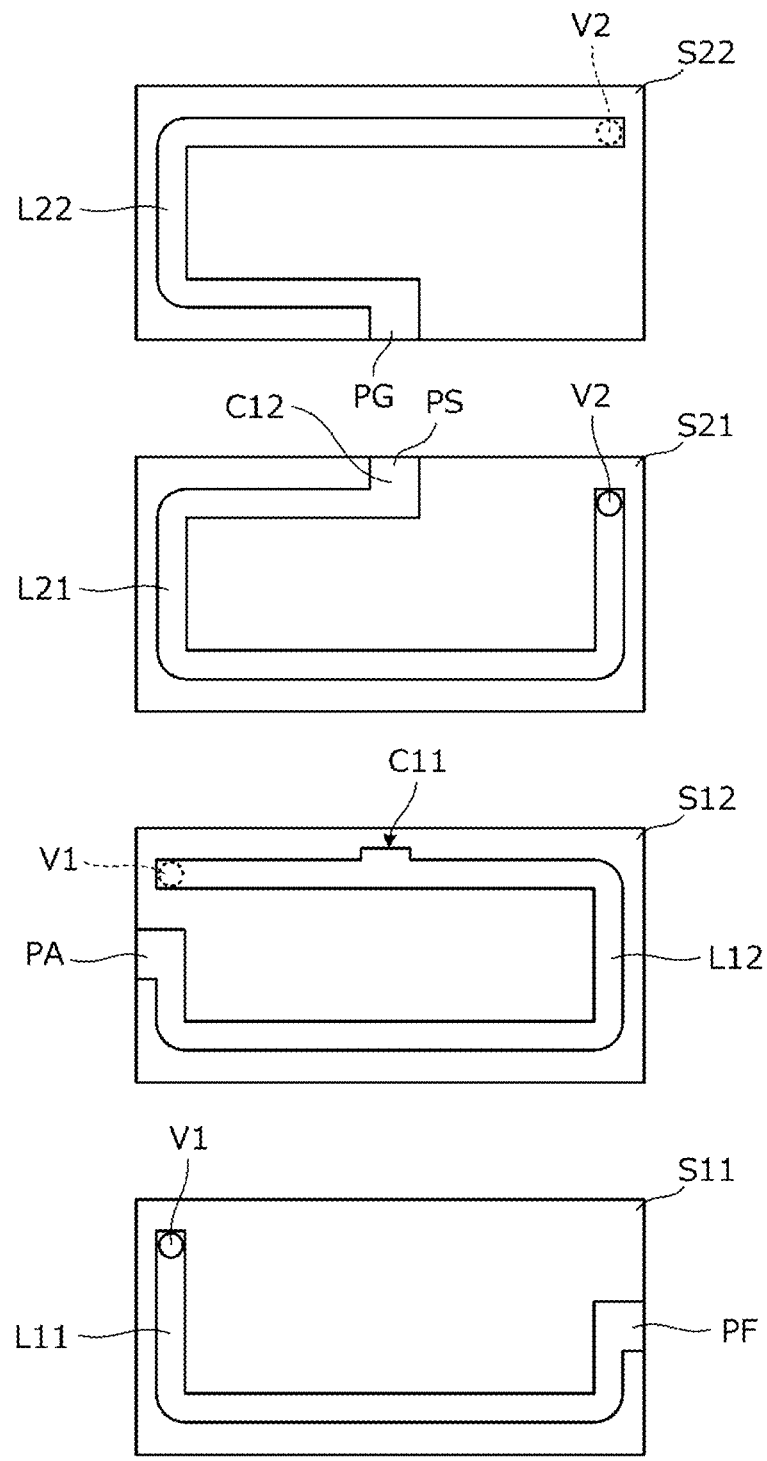
FIG. 2 is an exploded plan view that shows conductor patterns provided in layers of the antenna coupling element 30.

FIG. 1 is a perspective view of an antenna coupling element 30 that is an example of a coupling circuit according to a first preferred embodiment of the present invention. FIG. 2 is an exploded plan view that shows conductor patterns provided in layers of the antenna coupling element 30.

The antenna coupling element 30 of the first preferred embodiment is a rectangular parallelepiped or a substantially rectangular parallelepiped chip component that is mounted on a circuit board of an electronic device. In FIG. 1, the outer shape of the antenna coupling element 30 and the internal structure of the antenna coupling element 30 are separately shown. The outer shape of the antenna coupling element 30 is represented by the alternate long and two short dashed line. A feed circuit connection terminal PF, a feed radiating element connection terminal PA, a ground terminal PG, and a passive radiating element connection terminal PS are provided on the outer surface of the antenna coupling element 30. The antenna coupling element 30 includes a first surface MS1 and a second surface MS2 that is opposite from the first surface MS1. In the first preferred embodiment, the first surface MS1 is a mounting surface and faces the circuit board. A direction discrimination mark DDM is provided on the second surface MS2 (top surface) on the opposite side from the first surface MS1 (mounting surface). The direction discrimination mark DDM is used to detect the direction of the chip component, for example, when the antenna coupling element 30 as the chip component is mounted on the circuit board with a mounter.

The "feed radiating element" described in preferred embodiments of the present invention including the first preferred embodiment corresponds to a "first radiating element", and the "passive radiating element" corresponds to a "second radiating element".

A first conductor pattern L11, a second conductor pattern L12, a third conductor pattern L21, and a fourth conductor pattern L22 are provided in the antenna coupling element 30. The first conductor pattern L11 and the second conductor pattern L12 are electrically connected via an interlayer connection conductor V1. The third conductor pattern L21 and the fourth conductor pattern L22 are electrically connected via an interlayer connection conductor V2. In FIG. 1, electrically insulating base materials S11, S12, S21, S22 on which the above-described conductor patterns are provided are separately shown in a direction of lamination.

The feed circuit connection terminal PF and the feed radiating element connection terminal PA are terminals to which both ends of a primary coil (L1 described later) are electrically connected. The passive radiating element connection terminal PA and the ground terminal PG are terminals to which both ends of a secondary coil (L2 described later) are electrically connected. Although the names of the terminals are names in the case where the terminals are applied to an antenna device (described later), the names are used here.

As shown in FIG. 2, the first conductor pattern L11 is provided on the electrically insulating base material S11, the second conductor pattern L12 is provided on the electrically insulating base material S12, the third conductor pattern L21 is provided on the electrically insulating base material S21, and the fourth conductor pattern L22 is provided on the electrically insulating base material S22. As for these coil conductor patterns, the electrically insulating base materials S11, S12, S21, S22 are laminated, and the first conductor pattern L11, the second conductor pattern L12, the third conductor pattern L21, and the fourth conductor pattern L22 are provided in order from the layer closer to the mounting surface. In FIG. 2, the electrically insulating base materials on which the coil conductor patterns are provided are shown. In the antenna coupling element 30 of the first preferred embodiment, a plurality of electrically insulating base materials on which no coil conductor pattern is provided is laminated on each of the lower side of the electrically insulating base material S11 and the upper side of the electrically insulating base material S22.

A first end of the first conductor pattern L11 is electrically connected to the feed circuit connection terminal PF, and a second end of the first conductor pattern L11 is electrically connected to a first end of the second conductor pattern L12 via the interlayer connection conductor V1. A second end of the second conductor pattern L12 is electrically connected to the feed radiating element connection terminal PA. A first end of the third conductor pattern L21 is electrically connected to the passive radiating element connection terminal PS, and a second end of the third conductor pattern L21 is electrically connected to a first end of the fourth conductor pattern L22 via the interlayer connection conductor V2. A second end of the fourth conductor pattern L22 is electrically connected to the ground terminal PG.

A capacitance generating conductor pattern C11 is provided in a portion of the second conductor pattern L12. A capacitance generating conductor pattern C12 is formed in a portion of the third conductor pattern L21. The capacitance generating conductor pattern C11 of the second conductor pattern L12 and the capacitance generating conductor pattern C12 of the third conductor pattern L21 face each other in the direction of lamination and define a capacitance at the facing portion.

The capacitance generating conductor pattern C12 of the third conductor pattern L21 is also a portion of an extended conductor pattern from one end of the third conductor pattern L21 to the passive radiating element connection terminal PS. In other words, the extended conductor pattern (capacitance generating conductor pattern C12) and a conductor pattern facing the extended conductor pattern (capacitance generating conductor pattern C11) are capacitance generating conductor patterns.

When the antenna coupling element 30 is made of a resin multilayer board, the electrically insulating base materials S11, S12, S21, and S22 are preferably, for example, liquid crystal polymer (LCP) sheet, and the conductor patterns L11, L12, L21, and L22 are preferably, for example, formed by patterning copper foil. When the antenna coupling element 30 is made of a ceramic multilayer board, the electrically insulating base materials S11, S12, S21, S22 are preferably, for example, low-temperature co-fired ceramics (LTCC), and the conductor patterns L11, L12, L21, L22 are preferably, for example, formed by printing copper paste.

Figure 3:
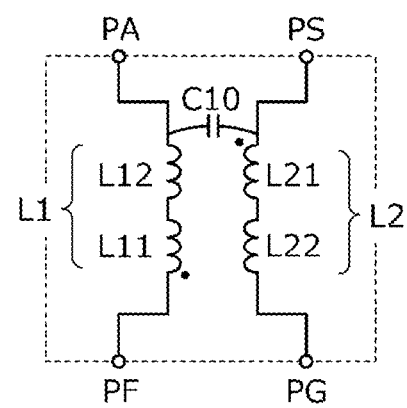
FIG. 3 is a circuit diagram of the antenna coupling element 30 including four coil conductor patterns.

FIG. 3 is a circuit diagram of the antenna coupling element 30 including the four coil conductor patterns. The second conductor pattern L12 and the first conductor pattern L11 are electrically connected in series and define the primary coil L1. Similarly, the fourth conductor pattern L22 and the third conductor pattern L21 are electrically connected in series and define the secondary coil L2. The primary coil L1 corresponds to a "first coil" and a "first coupling element". The secondary coil L2 corresponds to a "second coil" and a "second coupling element". The primary coil L1 and the secondary coil L2 are coupled to each other with a magnetic field. In FIG. 3, a capacitance that is generated between the primary coil L1 and the secondary coil L2 is represented by a capacitor C10.

With the above features, the conductor patterns L11, L12, L21, L22 overlap all around in plan view and the conductor patterns L11, L12, L21, L22 are closest to each other in the direction of lamination (adjacent to each other in the direction of lamination without intervening any other electrically insulating base material), so the coupling coefficient between the primary coil L1 and the secondary coil L2 is high. Each of the second conductor pattern L12 and the third conductor pattern L21 is longer than each of the first conductor pattern L11 and the fourth conductor pattern L22. Thus, the area in which the second conductor pattern L12 and the third conductor pattern L21 face each other is large, so the capacitance that is generated between the primary coil L1 and the secondary coil L2 is significantly increased.

A winding direction that is routed along a current path from the feed circuit connection terminal PF to the feed radiating element connection terminal PA is clockwise in plan view in FIG. 2, while a winding direction that is routed along a current path from the passive radiating element connection terminal PS to the ground terminal PG is counterclockwise in plan view in FIG. 2. In other words, the winding directions are opposite to each other.

Figure 4:
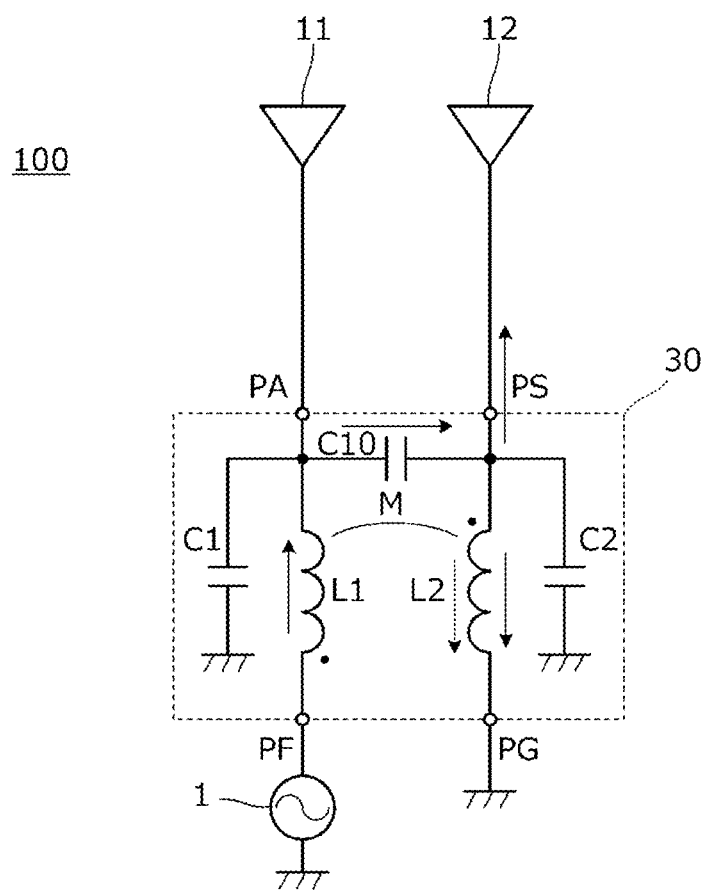
FIG. 4 is an equivalent circuit diagram of an antenna device 100 including the antenna coupling element 30, a feed radiating element 11, and a passive radiating element 12.

FIG. 4 is an equivalent circuit diagram of an antenna device 100 including the antenna coupling element 30, a feed radiating element 11, and a passive radiating element 12. In FIG. 4, a capacitor C1 that corresponds to a parasitic capacitance that is generated in the primary coil L1 and a capacitor C2 that corresponds to a parasitic capacitance that is generated in the secondary coil L2 are also shown.

As current is supplied from the feed circuit 1 to the feed radiating element 11 via the primary coil L1, current represented by the broken arrow flows through the secondary coil L2 because of magnetic field coupling (inductive coupling) between the primary coil L1 and the secondary coil L2. On the other hand, as represented by the solid arrow, current flows through a path (first path) of the feed circuit 1, the primary coil L1, the capacitor C10, and the secondary coil L2 or a path (second path) of the feed circuit 1, the primary coil L1, the capacitor C10, and the passive radiating element 12.

The passive radiating element 12 is equivalently shown as a circuit in which a series circuit of a reactance element and a radiation resistance is electrically connected between the passive radiating element connection terminal PS and a ground. Therefore, on the condition that the series circuit is lower in impedance than the secondary coil L2, current flows through the second path.

Current flowing through the primary coil L1 between the feed circuit 1 and the feed radiating element 11 flows through the secondary coil L2 or the passive radiating element 12 via the capacitor C10 even when no current flows through the feed radiating element 11. In other words, even at an anti-resonant frequency of the feed radiating element 11, at which no current flows through the secondary coil L2, current flows from the primary coil L1 (first coupling element) to the secondary coil L2 (second coupling element) or the passive radiating element 12 via the capacitor C10 (capacitance). For this reason, even when the resonant frequency of the passive radiating element 12 is equal or substantially equal to the anti-resonant frequency, the passive radiating element 12 resonates. Therefore, the passive radiating element 12 contributes to a wider bandwidth.

When the direction of current (first current) flowing from the primary coil L1 to the secondary coil L2 via the capacitor C10 is the same as the direction of current (second current) flowing through the secondary coil L2 because of magnetic field coupling with the primary coil L1, the first current and the second current enhance each other, and the passive radiating element 12 is driven, so a wider bandwidth is provided by the passive radiating element 12.

FIG. 1 and FIG. 2 show the example in which the conductor pattern lengths, that is, the numbers of turns, of the primary coil L1 and secondary coil L2 are equal or substantially equal to each other. Alternatively, the conductor pattern lengths, that is, the numbers of turns, may be determined according to the lengths (antenna lengths) of the feed radiating element 11 and passive radiating element 12. For example, when a passive radiating element is caused to resonate in a lower frequency band than a feed radiating element, the passive radiating element has a longer antenna length than the feed radiating element. In this case, the secondary coil L2 to which the passive radiating element is electrically connected has a longer conductor pattern length, that is, a greater number of turns, than the primary coil L1. Thus, an inductance that is added to the passive radiating element is increased to significantly decrease the resonant frequency and significantly improve the capability to drive the passive radiating element.

As described above, the feed radiating element 11 is a radiating element (first radiating element) that is supplied with current directly from the feed circuit 1 via the primary coil L1. The passive radiating element 12 is a radiating element (second radiating element) that is supplied with current indirectly from the feed circuit 1 side through magnetic field coupling between the primary coil L1 and the secondary coil L2.

FIG. 1 and FIG. 2 show the example in which the primary coil L1 includes the two conductor patterns provided in two layers of a multilayer body and the secondary coil L2 includes the two conductor patterns provided in two layers of the multilayer body. However, preferred embodiments of the present invention are not limited to this structure. The numbers of turns of the primary coil L1 and secondary coil L2 are not limited to less than one (not reaching one turn) as shown in FIG. 1 and FIG. 2, and may be greater than or equal to one turn.

Second Preferred Embodiment

In a second preferred embodiment of the present invention, an example of an antenna device and an electronic device including the antenna device will be described.

Figure 5:
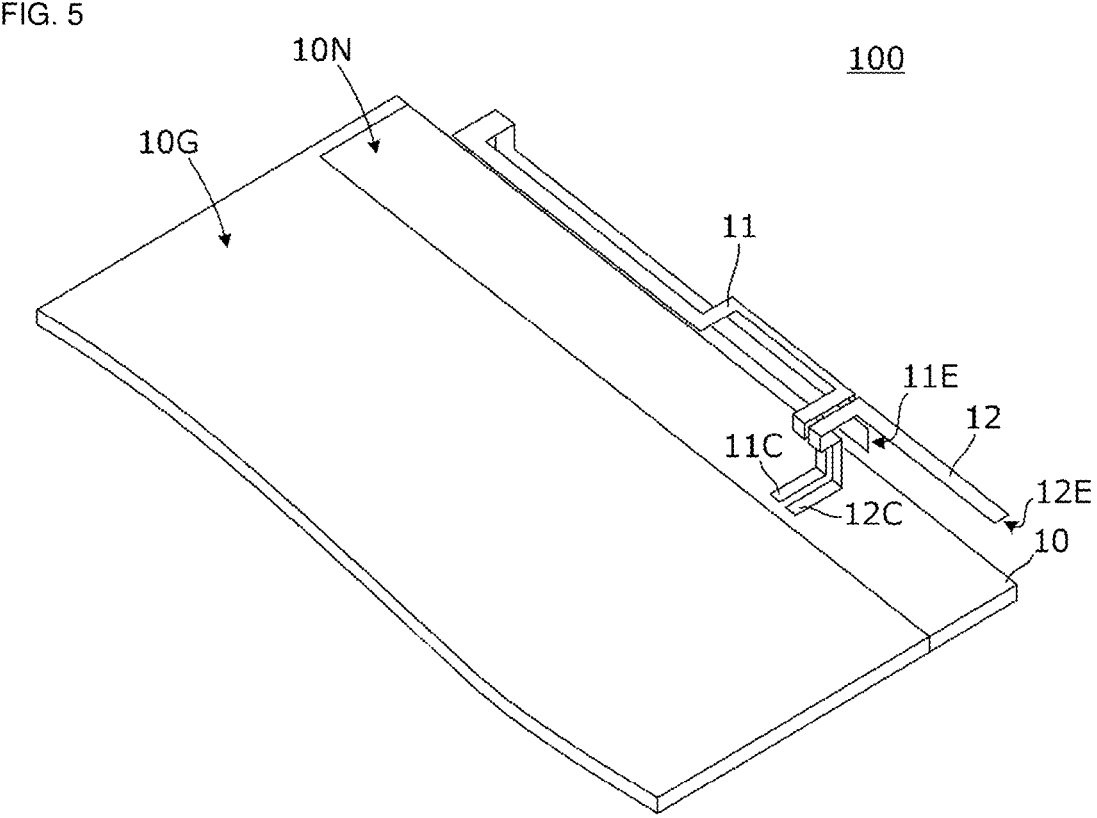
FIG. 5 is a perspective view of an antenna device 100 according to a second preferred embodiment of the present invention.

FIG. 5 is a perspective view of the antenna device 100 according to the second preferred embodiment. The antenna device 100 includes a substrate 10, the feed radiating element 11, and the passive radiating element 12. The substrate 10 includes a ground region 10G and a non-ground region 10N. A ground conductor pattern expanding in a sheet shape is provided in the ground region 10G. No sheet-shaped ground conductor is provided in the non-ground region 10N.

The feed radiating element 11 and the passive radiating element 12 are provided in the non-ground region 10N of the substrate 10. In FIG. 5, the feed radiating element 11 and the passive radiating element 12 represent only conductor pattern portions.

A main portion of the feed radiating element 11 and a main portion of the passive radiating element 12 are conductor patterns provided on the outer surface of a dielectric block or dielectric structure member. The dielectric block on which the main portions of the feed radiating element 11 and passive radiating element 12 are provided in this way is mounted on the substrate 10. The dielectric structure in which the main portions of the feed radiating element 11 and passive radiating element 12 are provided is incorporated as a portion of a casing and is electrically connected to conductor patterns of the substrate 10.

The feed radiating element 11 is a conductor pattern bent at multiple portions midway from its connection end 11C to its open end 11E. Similarly, the passive radiating element 12 is a conductor pattern bent at multiple portions midway from its connection end 12C to its open end 12E.

An antenna coupling element (the antenna coupling element 30 shown in FIG. 1) is mounted on the substrate 10. The antenna coupling element 30 is electrically connected to the connection end 11C of the feed radiating element 11 and the connection end 12C of the passive radiating element 12. The antenna coupling element 30 is as described in the first preferred embodiment. Therefore, even at the anti-resonant frequency of the feed radiating element 11, at which no current flows through the secondary coil L2, current flows from the primary coil L1 (first coupling element) to the secondary coil L2 (second coupling element) or the passive radiating element 12 via the capacitor C10 (capacitance).

Figure 6:
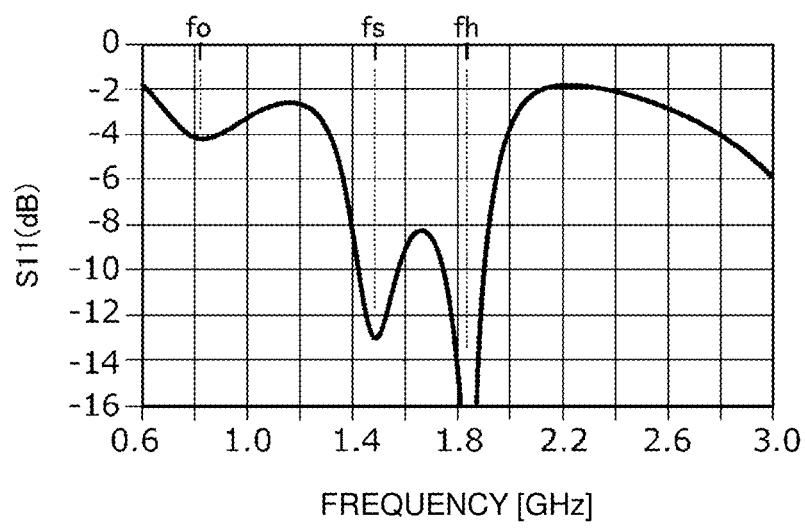
FIG. 6 is a graph that shows the frequency characteristics of the antenna device 100.
Figure 9A:
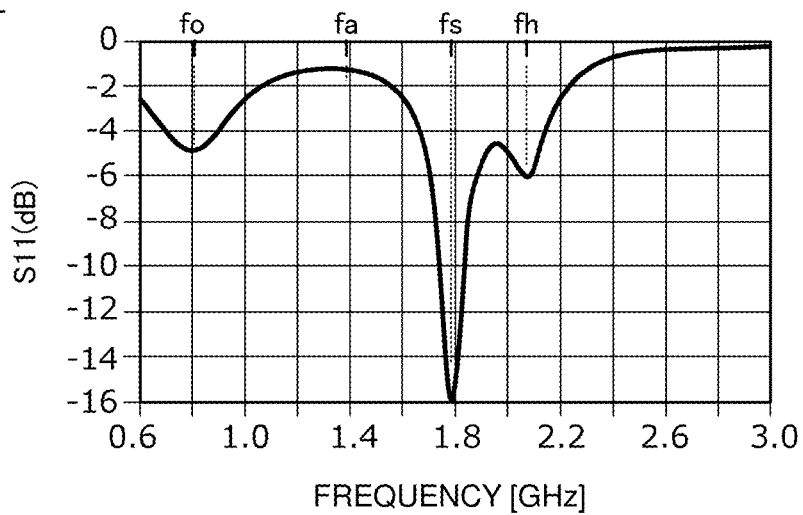
FIG. 9A is a graph that shows the frequency characteristics of an existing antenna device including a passive radiating element.
Figure 9B:
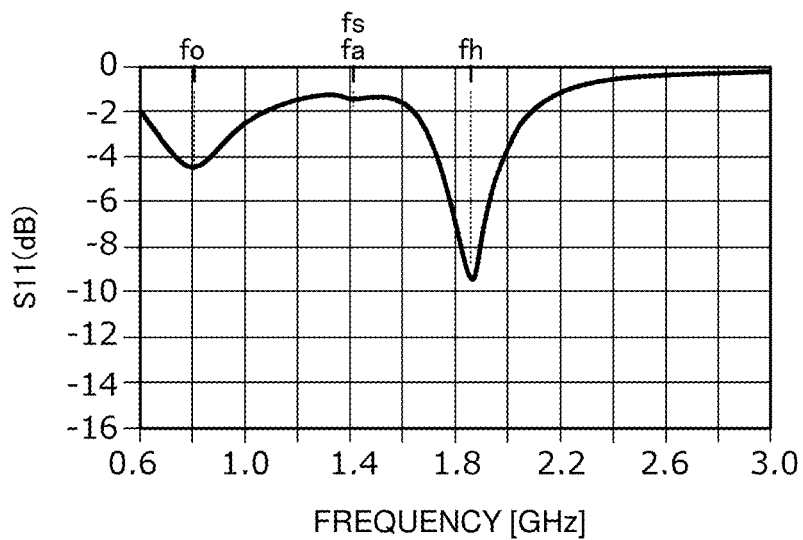
FIG. 9B is a graph that shows the frequency characteristics of the antenna device when the resonant frequency of the passive radiating element is decreased from the state shown in FIG. 9A.

FIG. 6 is a graph that shows the frequency characteristics of the antenna device 100. The abscissa axis represents frequency, and the ordinate axis represents a return loss (S11) of the antenna device 100, viewed from the feed circuit 1. In FIG. 6, resonant points appear at frequencies fo, fh, fs. The frequency fo is the fundamental ($\lambda/4$) resonant frequency of the feed radiating element 11, and the frequency fh is the harmonic ($3\lambda/4$) resonant frequency of the feed radiating element 11. The frequency fs is the resonant frequency of the passive radiating element 12. In this example, the frequency fs is equal or substantially equal to the anti-resonant frequency of the feed radiating element 11. However, the characteristics are not as shown as FIG. 9B as an existing example, and the resonant characteristics of the passive radiating element 12 appear.

In FIG. 6, a frequency band having the frequency fo as a center is used in communication of, for example, about 800 MHz band and about 900 MHz band of GSM (registered trademark), and a frequency band having the frequency fh as a center is used in communication of, for example, about 1800 MHz band of GSM (registered trademark). The frequency bands including the frequencies fs, fh are used in, for example, reception of GPS signals and communication of Band 11 and Band 21 of LTE. According to the second preferred embodiment, when the passive radiating element 12 and the antenna coupling element 30 are electrically connected, even the existing antenna element for communication of, for example, about 800 MHz band, about 900 MHz band, and about 1800 MHz band of GSM (registered trademark) can be directly used for reception of GPS signals and communication of Band 11 and Band 21 of LTE.

Figure 7:
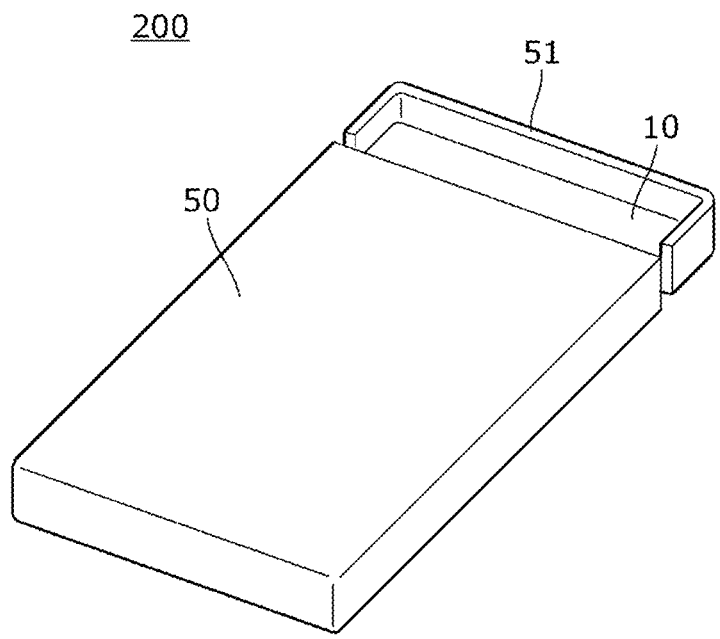
FIG. 7 is a perspective view that shows the main structure of an electronic device 200 according to the second preferred embodiment of the present invention.
Figure 8:
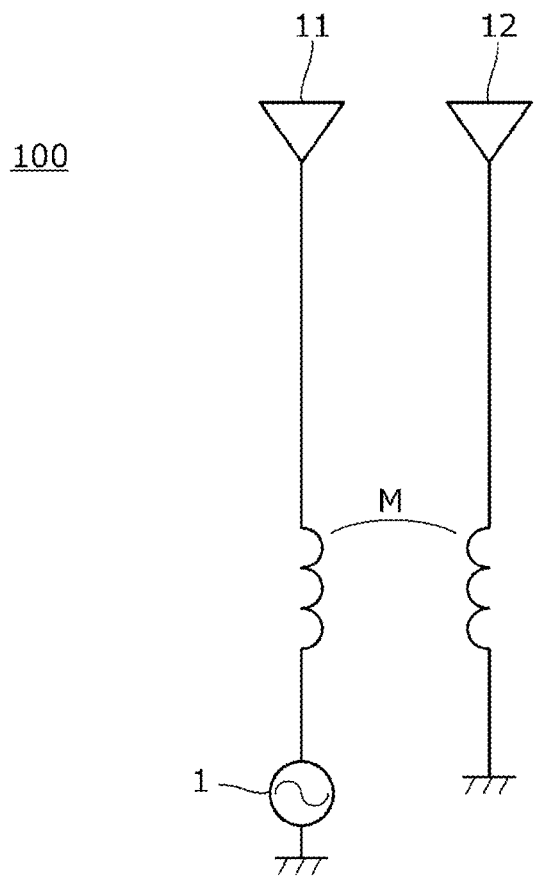
FIG. 8 is an equivalent circuit diagram of the existing antenna device 100 including a feed radiating element and a passive radiating element coupled to each other with a magnetic field.

FIG. 7 is a perspective view that shows the main structure of an electronic device 200 according to the second preferred embodiment. The electronic device 200 is, for example, a mobile electronic device, and includes an electrically conductive casing 50 and a resin bezel 51. However, in FIG. 7, the electronic device 200 is shown in a state in which one surface of the bezel 51 is open. The substrate 10 shown in FIG. 5 is accommodated in the casing. The non-ground region 10N of the substrate 10 shown in FIG. 5 is located at a portion of the bezel (a portion of the casing, not covered with a metal portion).

In the example shown in FIG. 1 to FIG. 4, a current path is provided by using the capacitance that is generated between the second conductor pattern L12 and the third conductor pattern L21. Alternatively, a capacitor other than the capacitance that is generated between the second conductor pattern L12 and the third conductor pattern L21 may be provided between the feed radiating element connection terminal PA and the passive radiating element connection terminal PS. For example, an electrode that defines a capacitor (electrode capacitance generating conductor pattern) may be provided. A capacitor that is electrically connected between the feed radiating element connection terminal PA and the passive radiating element connection terminal PS may be mounted outside the antenna coupling element 30 (for example, on the circuit board).

Antenna devices according to preferred embodiments of the present invention are not limited to a transmission purpose and may be used for reception or for transmission and reception. The antenna device also similarly operates even when transmission and reception are interchanged. The "feed circuit" is not limited to a circuit that outputs transmitting power, and, during reception, corresponds to a circuit that inputs a reception signal and amplifies the reception signal.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antenna coupling element comprising:
   a first coil;
   a second coil coupled to the first coil;
   a plurality of conductor patterns provided in a plurality of layers laminated via an electrically insulating layer; and
   a plurality of interlayer connection conductors providing an interlayer connection between predetermined positions of the plurality of conductor patterns; wherein
   a first end of the first coil is a feed circuit connection end, a second end of the first coil is a first radiating element connection end, a first end of the second coil is a second radiating element connection end, and a second end of the second coil is a ground connection end;
   a winding direction of an entirety of the first coil that is routed along a current path from the feed circuit connection end to the first radiating element connection end and a winding direction of an entirety of the second coil that is routed along a current path from the second radiating element connection end to the ground connection end are opposite to each other;
   the plurality of conductor patterns include a first conductor pattern, a second conductor pattern, a third conductor pattern, and a fourth conductor pattern, respectively provided in different layers in order of a direction of the lamination;
   the plurality of interlayer connection conductors includes a first interlayer connection conductor providing interlayer connection between the first conductor pattern and the second conductor pattern, and a second interlayer connection conductor providing interlayer connection between the third conductor pattern and the fourth conductor pattern;
   the first coil includes the first conductor pattern, the second conductor pattern, and the first interlayer connection conductor; and
   the second coil includes the third conductor pattern, the fourth conductor pattern, and the second interlayer connection conductor.

2. The antenna coupling element according to claim 1, wherein each of the second conductor pattern and the third conductor pattern has a longer conductor pattern length than a conductor pattern length of each of the first conductor pattern and the fourth conductor pattern.

3. The antenna coupling element according to claim 1, wherein at least one of the second conductor pattern and the third conductor pattern at least partially includes a capacitance generating conductor pattern that faces in a direction of the lamination to define a capacitance.

4. The antenna coupling element according to claim 3, wherein the third conductor pattern includes an extended conductor pattern that extends to an end portion of the electrically insulating layer, and the capacitance generating conductor pattern includes the extended conductor pattern and a conductor pattern facing the extended conductor pattern.

5. The antenna coupling element according to claim 1 wherein a capacitance is defined between the first coil and the second coil.

6. An antenna device comprising:
   the antenna coupling element according to claim 1;
   a first radiating element electrically connected to the first radiating element connection end; and
   a second radiating element electrically connected to the second radiating element connection end.

7. An electronic device comprising:
   the antenna device according to claim 6;
   a feed circuit electrically connected to the antenna device; and
   a casing accommodating the feed circuit; wherein
   at least a portion of the first radiating element is a portion of the casing, and at least a portion of the second radiating element is a portion of the casing.

8. The antenna coupling element according to claim 1, wherein
   the first end of the first coil is electrically connected to a feed circuit connection terminal provided on an outer surface of the antenna coupling element;
   the second end of the first coil is electrically connected to a first radiating element connection terminal provided on the outer surface of the antenna coupling element;
   the first end of the second coil is electrically connected to a second radiating element connection terminal provided on the outer surface of the antenna coupling element; and
   the second end of the second coil is electrically connected to a ground terminal provided on the outer surface of the antenna coupling element.

9. The antenna device according to claim 6, wherein the first radiating element is a feed radiating element and the second radiating element is a passive radiating element.

10. The antenna coupling element according to claim 1, wherein an electrically insulating base material on which no coil conductor pattern is provided is laminated on a surface of the electrically insulating layer.

11. The antenna coupling element according to claim 10, wherein the electrically insulating base material includes a liquid crystal polymer (LCP) sheet, and the plurality of conductor patterns are provided by patterning copper foil.

12. The antenna device according to claim 9, wherein current flows through a path of the first radiating element, the first coil, and the second radiating element only if an impedance of the second radiating element is lower than an impedance of the second coil.

13. The antenna coupling element according to claim 1, wherein
   at an anti-resonant frequency of the first radiating element, current flows from the first coil to the second coil or the second radiating element; and
   the first radiating element resonates at $\lambda/2$ at the anti-resonant frequency, where $\lambda$ is a wavelength of a propagating frequency.

14. An antenna device comprising:
   a first radiating element;
   a second radiating element;
   a coupling circuit including a first coupling element and a second coupling element, the first coupling element being electrically connected in series between the first radiating element and a feed circuit, the second coupling element being inductively coupled to the first coupling element and electrically connected between the second radiating element and a ground; and
   a capacitance provided between the first coupling element and the second coupling element; wherein
   at an anti-resonant frequency of the first radiating element, the first radiating element is an open circuit when viewed from the feed circuit and current flows from the first coupling element to the second coupling element or the second radiating element via the capacitance; and the first radiating element resonates at λ/2 at the anti-resonant frequency, where λ is a wavelength of a propagating frequency.

15. The antenna device according to claim 14, wherein the first coupling element and the second coupling element are coils coupled to each other with a magnetic field; and the capacitance is generated between the coil that is the first coupling element and the coil that is the second coupling element.

16. The antenna device according to claim 14, wherein at the anti-resonant frequency of the first radiating element, a direction of current that flows from the first coupling element to the second coupling element via the capacitance is a same direction as a direction of current that flows through the second coupling element as a result of magnetic field coupling with the first coupling element.

17. The antenna device according to claim 14, further comprising a capacitor electrically connected between a connection end of the first radiating element and a connection end of the second radiating element.

* * * * *